Aug. 22, 1961  H. R. LANGE ET AL  2,996,734
SCREW SLOTTING MACHINE WITH ROTARY WORK CARRIER BRAKING MEANS
Filed April 11, 1958  3 Sheets-Sheet 1

INVENTORS
Harry R. Lange
and Robert F. Mitchell
BY
Rockwell & Bentsler
ATTORNEYS

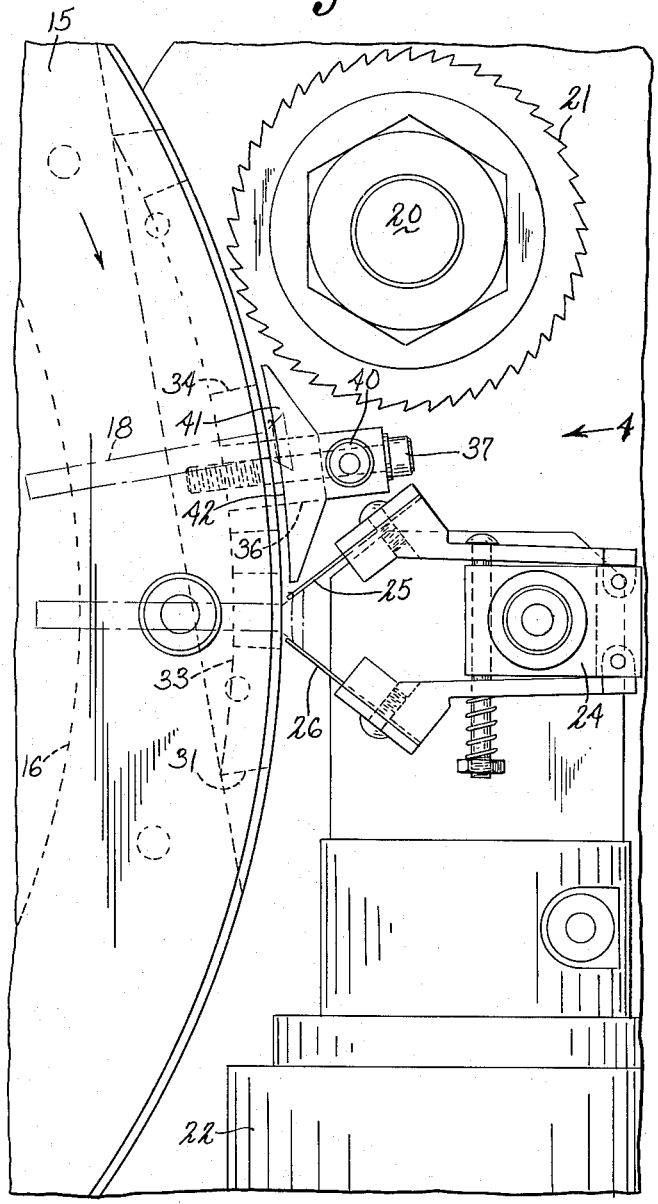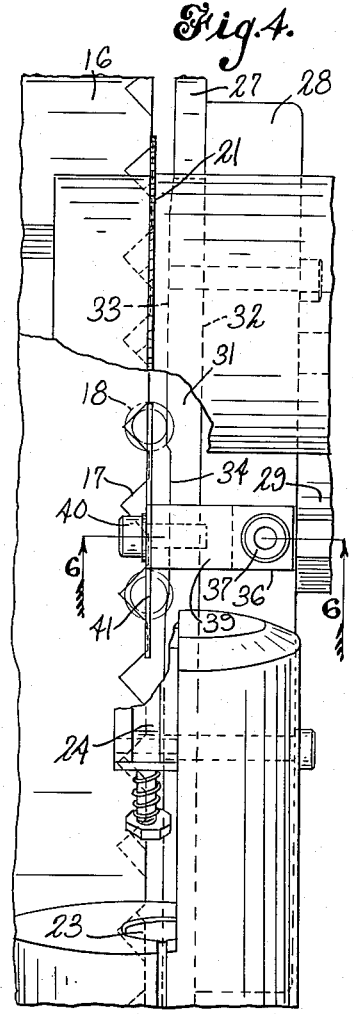

Aug. 22, 1961  H. R. LANGE ET AL  2,996,734
SCREW SLOTTING MACHINE WITH ROTARY WORK CARRIER BRAKING MEANS
Filed April 11, 1958  3 Sheets-Sheet 3
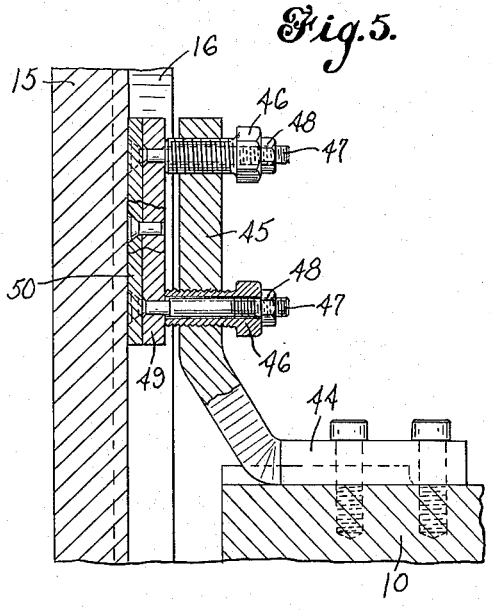
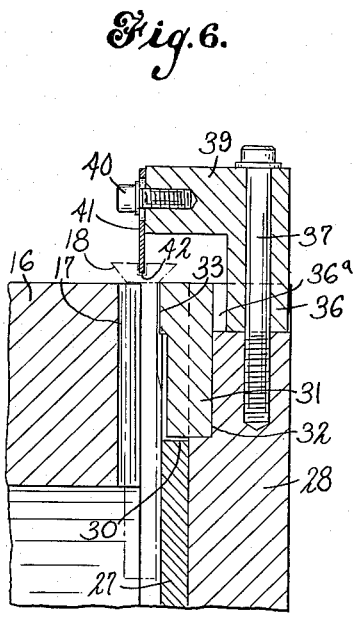
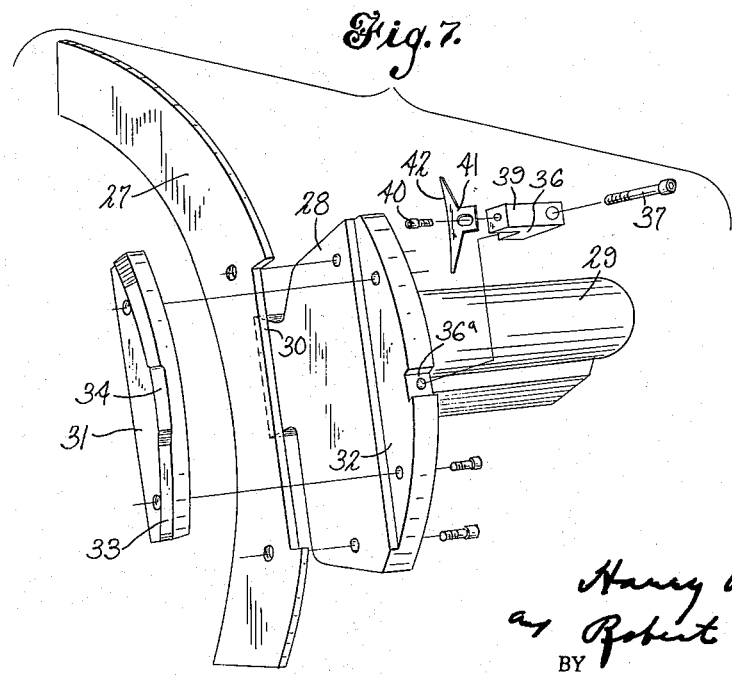
INVENTORS
Harry R. Lange
Robert F. Mitchell
BY
Rockwell, Beckwith
ATTORNEYS

1

2,996,734
SCREW SLOTTING MACHINE WITH ROTARY WORK CARRIER BRAKING MEANS
Harry R. Lange, Waterbury, and Robert F. Mitchell, Watertown, Conn., assignors, by mesne assignments, to Textron Inc., Providence, R.I., a corporation of Rhode Island
Filed Apr. 11, 1958, Ser. No. 727,839
3 Claims. (Cl. 10—6)

This invention relates to screw-slotting machines and more particularly to a device in which the screw blanks are carried by a rotating dial and a slotting saw is provided adjacent the dial to cut a slot in the heads of the blanks.

As the slotting saw operates on the blank a burr is often left at the ends of the slot and particularly at that end at which the saw leaves the blank. Means are usually provided to deburr the blanks or to cut this burr away so as to leave a smooth head upon the blank, this means also being located adjacent the saw and in a position to engage the blank after it leaves the saw. That is to say, both saw and deburring means or cutter are provided adjacent the dial so that the latter during its rotation will carry the blanks past the saw and thence past the deburring cutter.

In order for the deburring cutter to operate properly on the blanks, it is necessary that they be presented to the cutter in the proper position, and this may be conveniently effected by preventing rotation of the blanks after they leave the slotting saw. In the present construction means is provided between the slotting saw and the deburring cutter to engage the blanks and prevent rotation thereof so that the cutter will properly strip the burr from the blank. In the present application this means comprises a blank guide of bladelike form mounted adjacent the dial so that the guide can enter the slot cut by the slotting saw and positively prevent any rotation of the blanks.

Usually a presser member is provided upon the side of the blanks opposite the face of the dial to hold the blanks in the dial slots. This presser pad engages the blanks and this engagement will sometimes tend to rotate the blanks on their axes before they reach the deburring cutter. Such rotation is positively prevented, however, by the engagement of this bladelike guide member in the screw slot.

It sometimes also occurs in setting up a machine of the kind shown in the present application that the deburring cutter will not properly register with the screw blanks as they are carried past it by the dial. Such improper registration is sometimes caused by backlash or wear in the driving mechanism. It will be appreciated that, when the head of the blank is carried past the slotting saw and the latter effects engagement with the head of the blank, considerable resistance to rotation will be encountered by the dial as the slotting saw normally rotates in the direction opposite to that of the dial. This resistance will, if there is any play or backlash in the driving mechanism, cause unevenness in the rotation of the dial and the same is true when the saw leaves one blank prior to engaging the next following blank. This unevenness in rotation prevents proper synchronization of the deburring cutter with the blank. It has been found, however, that, if a braking or retarding means is provided to apply a braking action to the dial, this backlash or "jumping" of the dial when the saw enters and leaves the slot of a blank will be prevented. Such retarding means is also provided in the present structure.

One object of the invention is to provide a new and improved machine for slotting and deburring screw blanks.

2

A further object of the invention is to provide a new and improved means for slotting and deburring screw blanks wherein the blanks are carried by a dial past a slotting saw and thereafter past a deburring cutter and wherein means is provided between the saw and cutter to positively prevent rotation of the blanks so that they will be properly engaged by the deburring cutter.

A still further object of the invention is to provide a screw-slotting and deburring machine of the character described wherein the slotting saw is provided exteriorly of the rotating dial which carries the screw blanks and a guide member in the form of a blade is provided between the slotting saw and the deburring cutter to engage in the slot formed by the saw and hold the blanks against rotation and in the proper position for operation of the deburring tool.

Still another object of the invention is to provide a screw-slotting machine of the character described with means to prevent unevenness in the rotation of the dial which carries the blanks past the slotting saw.

To these and other ends the invention consists in the novel features and combinations of parts to be hereinafter described and claimed.

In the accompanying drawings:

FIG. 3 is an enlarged front elevational view of the parts of the device adjacent the slotting saw and deburring cutter;

FIG. 4 is a side view of the parts in FIG. 3, looking in the direction of the arrow 4 on FIG. 3, some parts being broken away;

FIG. 5 is a sectional view on line 5—5 of FIG. 1, showing the braking mechanism;

FIG. 6 is a sectional view on line 6—6 of FIG. 4; and

FIG. 7 is an exploded view of the pressure pad mechanism and blank guide.

Figure 1:
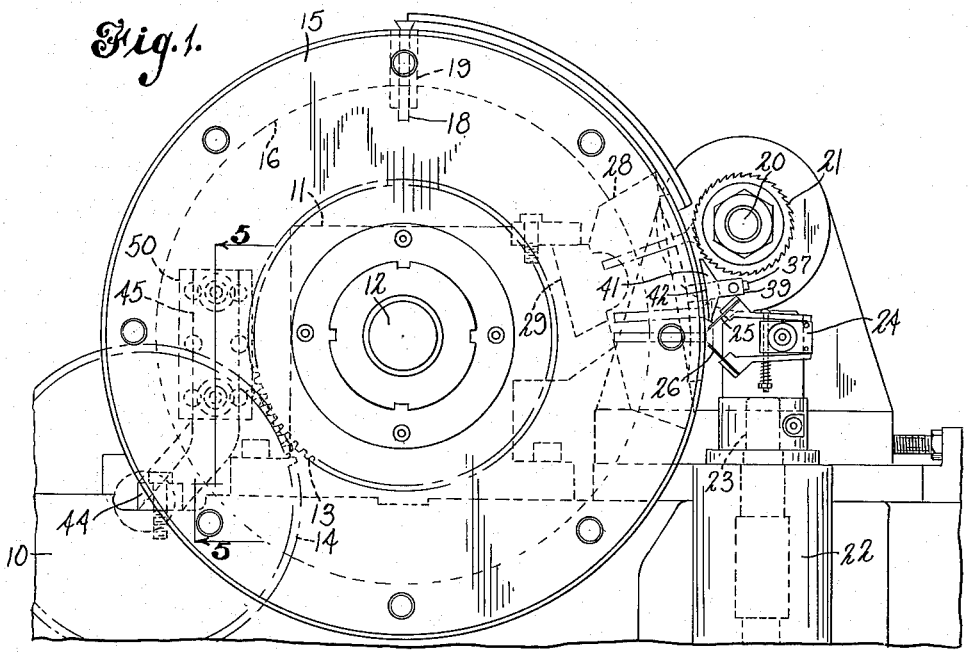
FIG. 1 is a front elevational view of a screw-slotting machine embodying the invention.

The screw-slotting machine of the present application is in general similar to that shown in United States Letters Patent No. 2,762,064, issued September 11, 1956, and comprises a bed or frame 10 having a bearing 11 mounted thereon in which is rotatably mounted a shaft 12. A gear 13 secured to this shaft may be driven by a gear 14, which latter gear may be driven by any suitable motive power (not shown).

Secured to the shaft 12 is a dial hub 15 to which is secured a ringlike dial 16 having radially directed slots 17 in its inner face to receive the screw blanks 18 (FIG. 6) and carry them in a circular path. The blanks may be fed to the dial by the chute 19 in a position, in this instance, in which the heads project radially outwardly from the dial.

Mounted adjacent the dial upon a shaft 20 is a slotting saw 21 which may be rotated from a suitable source of power (not shown), preferably separate from that which rotates the gear 14, and in a direction opposite to that of the dial, which latter member rotates in the direction of the arrow shown on FIG. 3. Rotatably mounted in a bearing 22 carried by the frame or bed of the machine is a shaft 23 which carries a cutter head 24 upon which are mounted deburring cutters 25 and 26 to engage the heads of the screw blanks after they leave the slotting saw and cut the burrs therefrom. The slotting and deburring mechanism is substantially like that shown in Patent No. 2,762,064 above referred to so that no further description is necessary. It may, however, be noted that the deburring cutters are mounted in spaced relation to the saw and on the leading side of the latter with respect to the direction of rotation of the dial.

Mounted adjacent the inner face of the dial is a pressure pad 27 (FIGS. 6 and 7) of arcuate shape which is adapted to contact the blanks on the side thereof opposite the dial after they have been fed to the latter from the chute 19 and hold these blanks in the dial slots. This pad is carried upon a bracket 28 carried by a slide 29 slidably mounted on the machine frame so that it may be capable of adjustment toward and from the dial. The pad 27 is cut away, as shown at 30, and within the notch so made a pad insert 31 is bolted to the bracket 28. This insert, as shown more particularly in FIG. 6, not only seats in the notch 30, but also in a recess 32 of the bracket 28. The insert 31 is provided with a projecting ridge 33 at its upper edge (which is of arcuate shape so as to lie opposite the periphery of the dial), and this projection extends from the body of the insert so as to engage the blank and hold it in place during the operation of the saw thereon. The surface of this ridge which opposes the dial is slightly relieved at 34 at a point opposite the blank guide member to be hereinafter described, and the ridge extends on both sides of this relieved portion so as to be in engagement with the blank prior to the time it reaches the guide member and at the time the blank is engaged by the burr remover.

An L-shaped bracket 36 is secured in a recess 36ª in the bracket 28 (FIGS. 6 and 7) by the screw 37, and on the laterally extending arm 39 of this member is secured by the screw 40 a blank guide member 41 having an arcuate edge 42 of a radius substantially that of the outer edge of the pressure pad 27 so that this edge will fit in the slot of the screws as they are carried past the guide member by the dial (FIG. 6). It will be seen that this guide member 41 is disposed between the slotting saw 21 and the cutters 25 and 26 so that by engaging the slot cut in the blank by the slotting saw the blanks will be positively prevented from turning in their passage between the saw and the deburring cutters. Thus the heads of the blanks will always be in proper position to be engaged by the cutters and the burr removed. This will prevent any rotation of the blanks which otherwise might occur due to the blanks being carried past the stationary pressure pad by the rotating dial.

Figure 2:
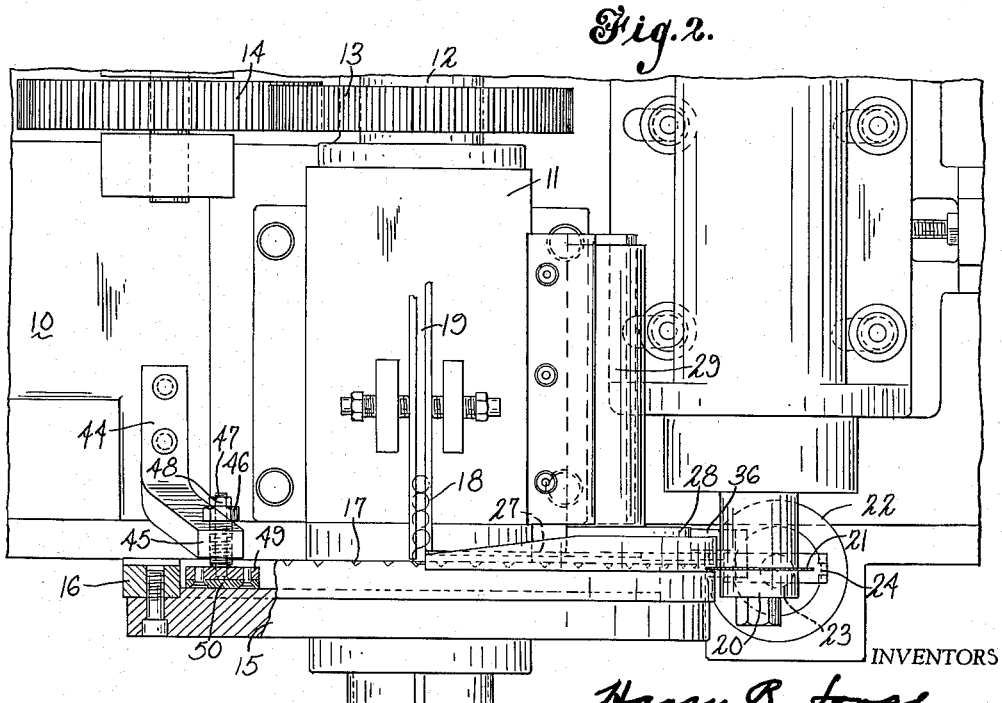
FIG. 2 is a top plan view thereof.

As previously stated, it sometimes occurs that due to backlash or wear in the driving mechanism the rotation of the dial will not always be constant. In order to make correction for such an eventuality a bracket 44 (FIG. 5) is secured to a portion of the frame 10 (FIGS. 2 and 5). This bracket is provided with an arm 45 extending upwardly to a position opposite the dial hub 15 within the annular or ringlike dial 16. Bushings 46 are adjustably threaded into the bracket part 45 and slidably mounted in these bushings are bolts 47 which receive nuts 48 upon their outer ends. The inner ends of the bolts are secured to a brake plate 49 which carries a brake lining 50 upon its inner surface, this lining being in contact with the dial hub 15 within the dial 16. It will be apparent that by adjusting the threaded bushings 46 with respect to the bracket part 45, more or less braking pressure may be applied to the dial hub by the lining 50 so as to take out all backlash in the part and assure the rotation of the dial hub at a constant speed notwithstanding the fact that its rotation will meet with resistance intermittently when the slotting saw engages the blanks. The inner edges of the bushings 46 engage the outer surface of the brake plate 49 so that tightening the nuts 48 will maintain the brake plate firmly in place.

While we have shown and described a preferred embodiment of our invention, it will be understood that it is not to be limited to all of the details shown, but is capable of modification and variation within the spirit of the invention and within the scope of the claims.

What we claim is:

1. A screw-slotting machine comprising a frame, a dial hub rotatably mounted thereon, a ringlike dial member carried by the hub adjacent the periphery thereof and provided with radially directed slots to receive screw blanks with their heads projecting radially from the dial, means for rotating said dial, a rotatably mounted slotting saw carried by the frame adjacent the dial to cut slots in the heads of the blanks, a bracket supported by the frame below the axis of the hub and extending upwardly from the frame to a position adjacent the face of the hub within the ringlike dial member, bushings threadedly mounted in the bracket for adjustment toward and from the dial, and a brake member fixed to said bushings and engaging the surface of the hub within said ringlike dial to frictionally resist rotation of the hub and dial.

2. A screw-slotting machine comprising a frame, a dial hub rotatably mounted thereon, a ringlike dial member carried by the hub adjacent the periphery thereof and provided with radially directed slots to receive screw blanks with their heads projecting radially from the dial, means for rotating said dial, a rotatably mounted slotting saw carried by the frame adjacent the dial to cut slots in the heads of the blanks, a bracket supported by the frame below the axis of the hub and extending upwardly from the frame to a position adjacent the face of the hub within the ringlike dial member, bushings threadedly mounted in the bracket for adjustment toward and from the dial, a brake plate having a brake lining thereon in frictional engagement with said dial hub within said ringlike dial, bolts secured to said brake plate and extending therefrom to be received in said bushings, and means for fixedly securing said bolts to the bushings to adjust the pressure of the brake lining on said dial hub when said bushings are adjusted.

3. A screw-slotting machine comprising a frame, a dial hub rotatably mounted thereon, a ringlike dial member carried by the hub adjacent the periphery thereof and provided with radially directed slots to receive screw blanks with their heads projecting radially from the dial, means for rotating said dial, a rotatably mounted slotting saw carried by the frame adjacent the dial to cut slots in the heads of the blanks, a bracket supported by the frame below the axis of the hub and extending upwardly from the frame to a position adjacent the face of the hub within the ringlike dial member, bushings threadedly mounted in the bracket for adjustment toward and from the dial, a brake plate having a brake lining thereon in frictional engagement with said dial hub within said ringlike dial, bolts secured to said brake plate and extending therefrom through said bushings, nuts threadedly mounted on the extended end of said bolts to clamp the bushings between the brake plate and nuts and fixedly secure the brake plate to the bushings whereby, when the bushings are threadedly adjusted, the pressure of the brake lining on the dial is varied.

References Cited in the file of this patent

UNITED STATES PATENTS

| | | |
|---|---|---|
| 575,016 | Towne | Jan. 12, 1897 |
| 1,776,765 | Ferris | Sept. 23, 1930 |
| 1,950,419 | Sinderson | Mar. 13, 1934 |
| 2,384,561 | Muffett | Sept. 11, 1945 |
| 2,762,064 | Byam | Sept. 11, 1956 |
| 2,829,387 | Carangelo | Apr. 8, 1958 |